United States Patent
Rattunde

(10) Patent No.: US 10,357,860 B2
(45) Date of Patent: Jul. 23, 2019

(54) TWIN CLAMP AND METHOD FOR SIMULTANEOUSLY CLAMPING TWO ELONGATE PROFILE SEGMENTS

(71) Applicant: RATTUNDE & CO GMBH, Ludwigslust (DE)

(72) Inventor: Ulrich Rattunde, Bentwisch (DE)

(73) Assignee: Rattunde AG, Ludwigslust (DE)

( * ) Notice: Subject to any disclaimer, the term of this patent is extended or adjusted under 35 U.S.C. 154(b) by 539 days.

(21) Appl. No.: 14/912,217

(22) PCT Filed: Aug. 13, 2014

(86) PCT No.: PCT/EP2014/067369
§ 371 (c)(1),
(2) Date: Feb. 16, 2016

(87) PCT Pub. No.: WO2015/022382
PCT Pub. Date: Feb. 19, 2015

(65) Prior Publication Data
US 2016/0184942 A1 Jun. 30, 2016

(30) Foreign Application Priority Data
Aug. 16, 2013 (DE) .................. 10 2013 108 895

(51) Int. Cl.
*B23Q 3/06* (2006.01)
*B25B 1/20* (2006.01)
(Continued)

(52) U.S. Cl.
CPC ............. *B23Q 3/061* (2013.01); *B23Q 3/064* (2013.01); *B23Q 3/066* (2013.01); *B25B 1/20* (2013.01);
(Continued)

(58) Field of Classification Search
CPC ........ B23Q 3/061; B23Q 3/066; B23Q 3/064; B25B 5/147; B25B 5/006; B25B 1/2478; B25B 1/20
See application file for complete search history.

(56) References Cited

U.S. PATENT DOCUMENTS

2010/0170081 A1    7/2010   Kuroda

FOREIGN PATENT DOCUMENTS

DE    1552302 A    10/1969
DE    3532028 A1    3/1987
(Continued)

OTHER PUBLICATIONS

Machine Translation of DE20001092U1; Mar. 30, 2000 (Year: 2000).*

*Primary Examiner* — Ryan J. Walters
(74) *Attorney, Agent, or Firm* — Bay State IP, LLC

(57) ABSTRACT

The invention relates to a twin clamp, comprising two receptacles (61, 62), each of which has two movable clamping jaws (611, 612, 621, 622) and by means of each of which an elongate profile segment (71, 72) having a circular cross-section can be clamped in the contact section, each elongate profile segment having a center axis (D71, D72) and an outside diameter, wherein two clamping jaws (611, 612, 621, 622) of different receptacles (61, 62) are coupled to one another via a respective differential gearing (41, 42) and two clamping jaws (611, 612, 621, 622) of the same receptacle (61, 62) are coupled to one another via a synchronous gearing (51, 52) and the position of the center axes (D71, D72) of the clamped elongate profile segments (71, 72) is independent of the size of the outside diameters of the elongate profile segments (71, 72).

7 Claims, 6 Drawing Sheets

Figure 1:
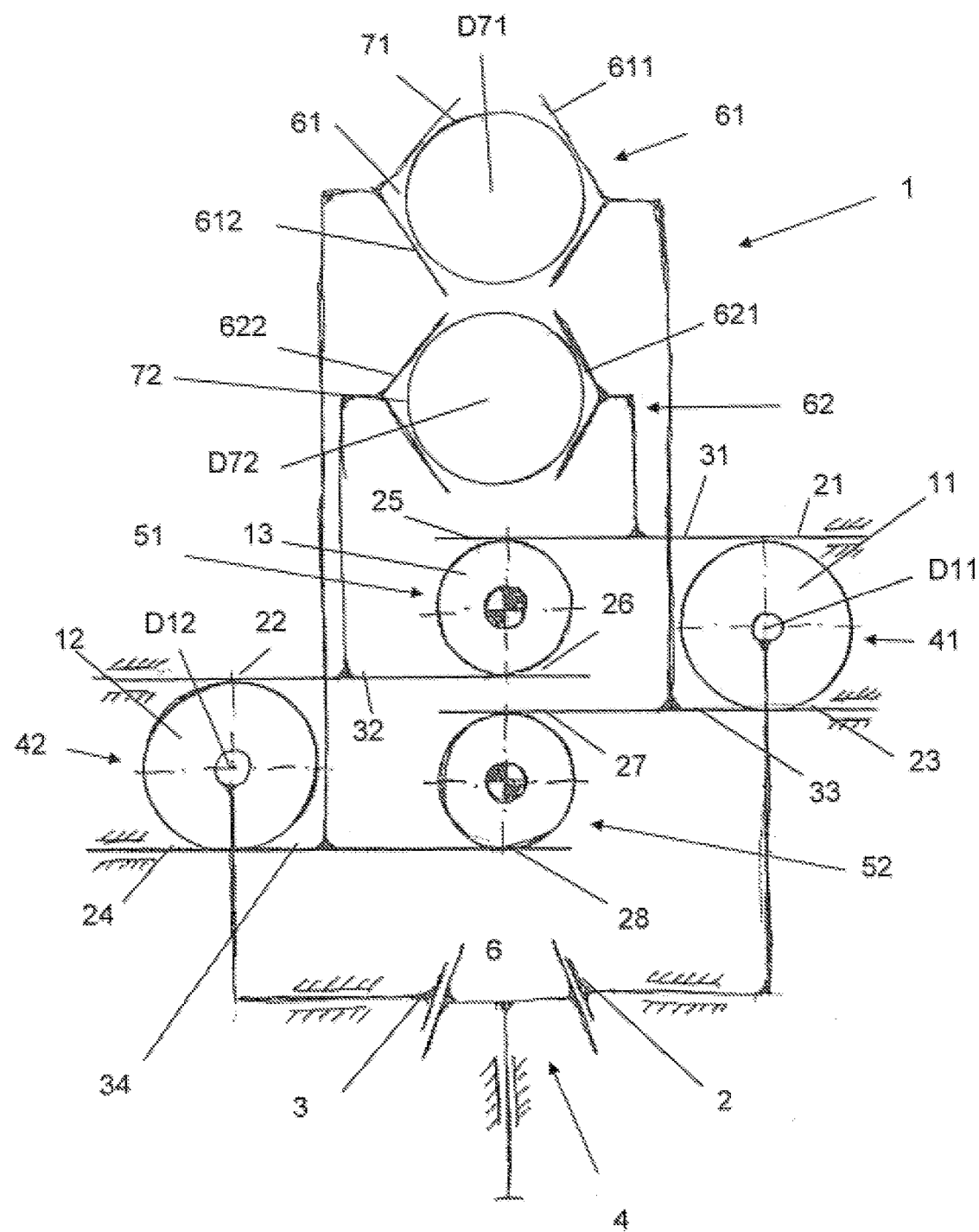

(51) Int. Cl.
*B25B 1/24* (2006.01)
*B25B 5/00* (2006.01)
*B25B 5/14* (2006.01)

(52) U.S. Cl.
CPC ............ *B25B 1/2478* (2013.01); *B25B 5/006* (2013.01); *B25B 5/147* (2013.01)

(56) References Cited

FOREIGN PATENT DOCUMENTS

| | | |
|---|---|---|
| DE | 4100148 A1 | 7/1991 |
| DE | 20001092 U1 | 3/2000 |
| DE | 102010035633 | 11/2011 |
| FR | 2062084 A5 | 6/1971 |
| JP | B 51-45861 | 12/1976 |
| WO | 2007027449 | 7/2007 |

\* cited by examiner

TWIN CLAMP AND METHOD FOR SIMULTANEOUSLY CLAMPING TWO ELONGATE PROFILE SEGMENTS

CROSS REFERENCE TO RELATED APPLICATION

This application is for entry into the U.S. National Phase under § 371 for International Application No. PCT/EP2014/067369 having an international filing date of Aug. 13, 2014, and from which priority is claimed under all applicable sections of Title 35 of the United States Code including, but not limited to, Sections 120, 363, and 365(c), and which in turn claims priority under 35 USC 119 to German Patent Application No. 10 2013 108 895.3 filed on Aug. 16, 2013.

The invention relates to a twin clamp and to a method for simultaneously clamping two elongate profile segments using the twin clamp.

Twin clamps are known in principle in the prior art. Ends of pipe sections which have been cut to length are usually aftertreated after being cut to length. The aftertreatment may consist of a chamfering, deburring or washing. During this, the pipes are machined simultaneously at their two ends. By way of example, an inside chamfer or outside chamfer or a flat face is milled at each of the two pipe ends. In principle, the pipe is securely clamped for this purpose, and two machining heads move towards the pipe ends, in the continuation of the pipe centre axis, and form the chamfers and the flat face by moving the machining head in rotation on the pipe ends. To this end, it is necessary that the axis of rotation of the machining heads and the pipe centre axis are always arranged exactly in the continuation of one another, regardless of the pipe diameter. In other words, the axis of rotation of the machining head must lie precisely on the centre axis of the pipe section so that, during the rotational movement of the machining head, there is applied to the pipe end an outside or inside chamfer which is of identical size around the entire pipe circumference. If the pipe centre axis and the axis of rotation of the machining head were to be arranged offset from one another, a disadvantageous elliptical profile would be chamfered onto the pipe end by the rotational movement of the machining head.

The chamfering of pipe ends is particularly problematic when two pipes are to be clamped simultaneously in a twin clamp and the four pipe ends of the two pipes are machined simultaneously by four machining heads. The pipe sections which have been cut to length are clamped parallel to one another, and the two left-hand and the two right-hand ends are in each case machined by a pair of machining heads. The relative position of the axes of rotation of the two machining heads at each side is constant. The simultaneous machining of two pipe sections is problematic because fundamentally there are never two pipe sections which have exactly the same outside diameter. The outside diameters of the pipes always differ by fractions of micrometers so that, when two pipes are clamped simultaneously, there is firstly the problem that, in the case of a twin clamp which has no elasticity, always just one of the two pipes is actually securely clamped between the two clamping jaws of a receptacle, while the other pipe is not securely clamped. Compensation by way of some degree of elasticity must always take place. On the other hand, there is the problem that the relative distance between the two centre axes of the two pipes should not be dependent on the pipe diameter. In other words, the two centre axes must always be at the same location in space and thus also relative to one another, regardless of the pipe diameter, so that the two machining heads can be moved towards the two pipe ends on each side of the two pipe sections always precisely with their axis of rotation in the continuation of the centre axis of the two pipes.

DE 10 2010 035 633 B3 discloses a hydraulic multipart clamping device which enables an accurately reproducible machining and positioning of long, rod-like workpieces in a horizontal position by means of a complicated sensor system.

DE 41 00 148 A1 discloses a pallet for holding and for transporting workpieces. Here, chronically shaped jaws are moved by means of a spindle and can thereby clamp workpieces.

DE 1 552 302 discloses a chuck for machine tools, in which the radial adjustment of the clamping jaws takes place by means of a rotational movement, wherein, in order to achieve the rotational movement which brings about the adjusting movement of the clamping jaws, a reducing gearing in the form of a planetary differential gearing is provided, which is detachably connected to a drive motor.

WO 2007/027449 A2 discloses a clamping device for a pipe, in which, by actuating a handle, clamping jaws can be moved relative to one another via a gearing and thereby can clamp the pipe.

The object of the present invention is therefore to provide a twin clamp which enables the abovementioned machining of ends of elongate profile segments, and also to provide a method which solves the problems mentioned above.

With regard to the device, the object is achieved by a twin clamp having the features of claim 1.

The twin clamp according to the invention is preferably installed in a machine for cutting elongate profiles to length. After elongate profiles have been cut to length, they can be gripped individually or in pairs by means of a gripper and placed into the twin clamp. The twin clamp securely clamps the two elongate profile segments. The two elongate profile segments are in this case arranged next to one another, preferably parallel to one another, in the twin clamp and are fed in the clamped state to a further machining step. The further machining step may be a chamfering of the ends of the elongate profile segments. In this case, the two adjacent ends of the two elongate profile segments are guided towards rotating tool heads, or vice versa, namely in such a way that the two centre axes of the elongate profile segments are in each case identical to the two axes of rotation of the tool heads. The twin clamp fixes or holds the two elongate profile segments in the described position, and the two rotating tool heads are simultaneously moved in the longitudinal direction, while rotating, towards the two adjacent ends of the segments on one side and form an outside or inside chamfer or a flat face or the like at the end of the segments. According to the invention, the position of the centre axes of the clamped elongate profile segments is independent of the size of the outside diameters of the elongate profile segments. As a result, the two elongate profile segments in each working cycle are always positioned in a centric manner relative to the two tool heads, regardless of the outside diameter. In each working cycle, therefore, even in the case of variable outside diameters of the elongate profile segments, a precisely rotation-symmetrical machining of the ends thereof will be carried out. The two outside diameters of the two simultaneously clamped elongate profile segments in one working cycle may be different from one another and/or the outside diameters of the elongate profile segments in different working cycles may be different from one another.

Usually, the four ends of the two elongate profile segments are machined simultaneously by two pairs of rotating tool heads.

The twin clamp according to the invention comprises two receptacles, each of which has two movable clamping jaws and by means of each of which an elongate profile segment having a circular cross-section can be clamped, each elongate profile segment having a centre axis and an outside diameter, wherein two clamping jaws of different receptacles are coupled to one another via a respective differential gearing and two clamping jaws of the same receptacle are coupled to one another via a synchronous gearing and the position of the centre axes of the clamped elongate profile segments is independent of the size of the outside diameters of the elongate profile segments.

The twin clamp according to the invention makes it possible to clamp securely, without elastic deformation, two elongate profile segments of different outside diameter, regardless of the size of the outside diameters of the two elongate profiles within a certain predefined tolerance range, and moreover to keep constant in space during each working cycle the position of centre axes of the two elongate profile segments, regardless of the outside diameter of the elongate profile segments.

Elongate profile segments will be understood here to mean segments of elongate profiles such as pipes or solid profiles. The elongate profiles have a circular outside diameter, wherein circular here will be understood to mean also slight deviations in the micrometer range from the exact circular shape. The outside diameter refers here to the region of the elongate profiles which comes into contact with the clamping jaws of the receptacles during the clamping operation. Preferably, however, the elongate profile segments have an identical cross-sectional shape along their entire longitudinal extension, in particular an identical outside diameter, wherein, here too, an identical cross-sectional shape and an identical outside diameter will also be understood to mean slight deviations in the micrometer range.

Advantageously, the twin clamp is driven by a centric clamp, wherein the centric clamp is connected in a fixed position to the two differential gearings and the differential gearings can be moved away from one another or towards one another in a precisely symmetrical manner by means of the centric clamp, along a longitudinal direction which preferably runs exactly perpendicular to the longitudinal extension of the two clamped elongate profile segments. However, angled embodiments are also conceivable, wherein the longitudinal direction is arranged at an angle to the longitudinal extension. This angle is preferably constant, regardless of the diameter of the elongate profile segment.

Preferably, a first clamping jaw of the first receptacle and a second clamping jaw of the second receptacle are coupled to one another via a first differential gearing and another first clamping jaw of the first receptacle and another second clamping jaw of the second receptacle are coupled to one another via a second differential gearing, and the first clamping jaw and the other first clamping jaw are coupled to one another via a first synchronous gearing and the second clamping jaw and the other second clamping jaw are coupled to one another via a second synchronous gearing.

A secure clamping of elongate profile segments of different diameter is thus achieved by a mechanically sophisticated construction.

Advantageously, the twin clamp comprises a centric clamp which moves the two differential gearings relative to one another, preferably in a precisely symmetrical manner. Centric clamps have been known for a long time and are therefore reliable.

In one preferred embodiment of the twin clamp, there is provided a first differential gearing comprising a first synchronous support having at least one first tooth row and comprising a third synchronous support having at least one third tooth row, and at least one first differential pinion which engages in the at least one first and the at least one third tooth row and couples the first and third tooth row to one another, and a second differential gearing comprising a second synchronous support having at least one second tooth row and comprising a fourth synchronous support having at least one fourth tooth row, and at least one second differential pinion which engages in the at least one second and the at least one fourth tooth row and couples the second and fourth tooth row to one another.

In this embodiment of the invention, the two differential gearings can be manufactured in an exact and highly precise manner in that the two differential pinions and the two tooth rows along the respective synchronous supports are manufactured for example by means of wire erosion processes or similar manufacturing processes.

In a further embodiment of the invention, the at least one first tooth row comprises two first tooth row sections which are located opposite one another and between which two first groups of first pinions are arranged, and two third tooth row sections which are located opposite one another are arranged between the two first groups of first differential pinions, wherein each of the groups of first differential pinions engages in respectively one first and one second tooth row section, and the at least one second tooth row comprises two second tooth row sections which are located opposite one another and between which two second groups of second differential pinions are arranged, and two fourth tooth row sections which are located opposite one another are arranged between the two second groups of second differential pinions, and each of the groups of second differential pinions engages in respectively one second and one fourth tooth row section.

Here, the tooth rows are preferably divided in each case into two tooth row sections which are located opposite one another or run next to one another, as a result of which increased guidance stability is achieved.

Advantageously, there is provided a first synchronous gearing which has at least one fifth tooth row on the first synchronous support with two fifth tooth row sections located next to one another and at least one sixth tooth row on the second synchronous support with two sixth tooth row sections, and in each case there is arranged between the two fifth and the two sixth tooth row sections a first synchronous pinion which couples the two fifth and sixth tooth row sections to one another, and a second synchronous gearing which has at least one seventh tooth row on the third synchronous support and at least one eighth tooth row on the fourth synchronous support, and there is arranged between the seventh and eighth tooth rows at least one second synchronous pinion which couples the seventh and eighth tooth row to one another.

The synchronous supports therefore preferably also have tooth rows with two tooth row sections, in order also here to permit increased guidance stability.

In addition, in each case a plurality of synchronous or differential pinions are provided both for the synchronous gearing and also for the differential gearing, in order also thereby to permit an increased and more stable guidance.

In one preferred further development of the invention, the first differential pinions and second differential pinions are rotatably mounted on a first and second differential support, and the first and second differential support are connected in each case in a fixed position to carrier plates of the centric clamp. The two carrier plates of the centric clamp can move towards one another and away from one another in a precisely symmetrical manner along the width direction.

Preferably, one clamping jaw of the first receptacle is connected in a fixed position to the first synchronous support and the second clamping jaw of the first receptacle is connected in a fixed position to the second synchronous support, and the first clamping jaw of the second receptacle is connected in a fixed position to the third synchronous support and the second clamping jaw of the second receptacle is connected in a fixed position to the fourth synchronous support.

By virtue of this embodiment, a very low-maintenance embodiment of a synchronous differential clamp having two receptacles is provided, which enable the simultaneous secure clamping of two elongate profile segments, preferably pipes, and at the same time keep constant in absolute space the relative position of the centre axes of the two elongate profile segments relative to one another and also the position of the two elongate profile centre axes, regardless of the size of the outside diameter of one or of each of the two elongate profile segments during the respective clamping operation and between the different clamping operations of different working cycles.

With regard to the method, the object is achieved by a method having the features of claim 9.

The method according to the invention for simultaneously clamping two elongate profile segments using a twin clamp according to any one of the abovementioned embodiments makes it possible that the two elongate profile segments are securely clamped and the centre axes of the clamped elongate profile segments are positioned independently of the size of the outside diameters of the elongate profile segments.

As a result, a considerable improvement over the prior art is achieved because, due to the unvarying arrangement of the elongate profile segments in the twin clamp in different working cycles, the further steps of machining the ends of the elongate profile segments are considerably simplified since the tool heads used for machining the ends of the elongate profile segments need not be readjusted in each working cycle in terms of their relative position with respect to the ends.

In one preferred further development of the method according to the invention, a first elongate profile segment having a larger diameter than that of the second elongate profile segment is securely clamped by the first receptacle and the second elongate profile segment is securely clamped by the second receptacle, and the centric clamp is closed and as a result the first and second receptacle are closed until the first elongate profile segment is located in the first receptacle in a manner secured against rotation, and by further closing of the centric clamp the two differential gearings are activated, and the second receptacle is closed, and the movement of the two second clamping jaws of the second receptacle are synchronized by the at least one synchronous gearing.

Figure 2:
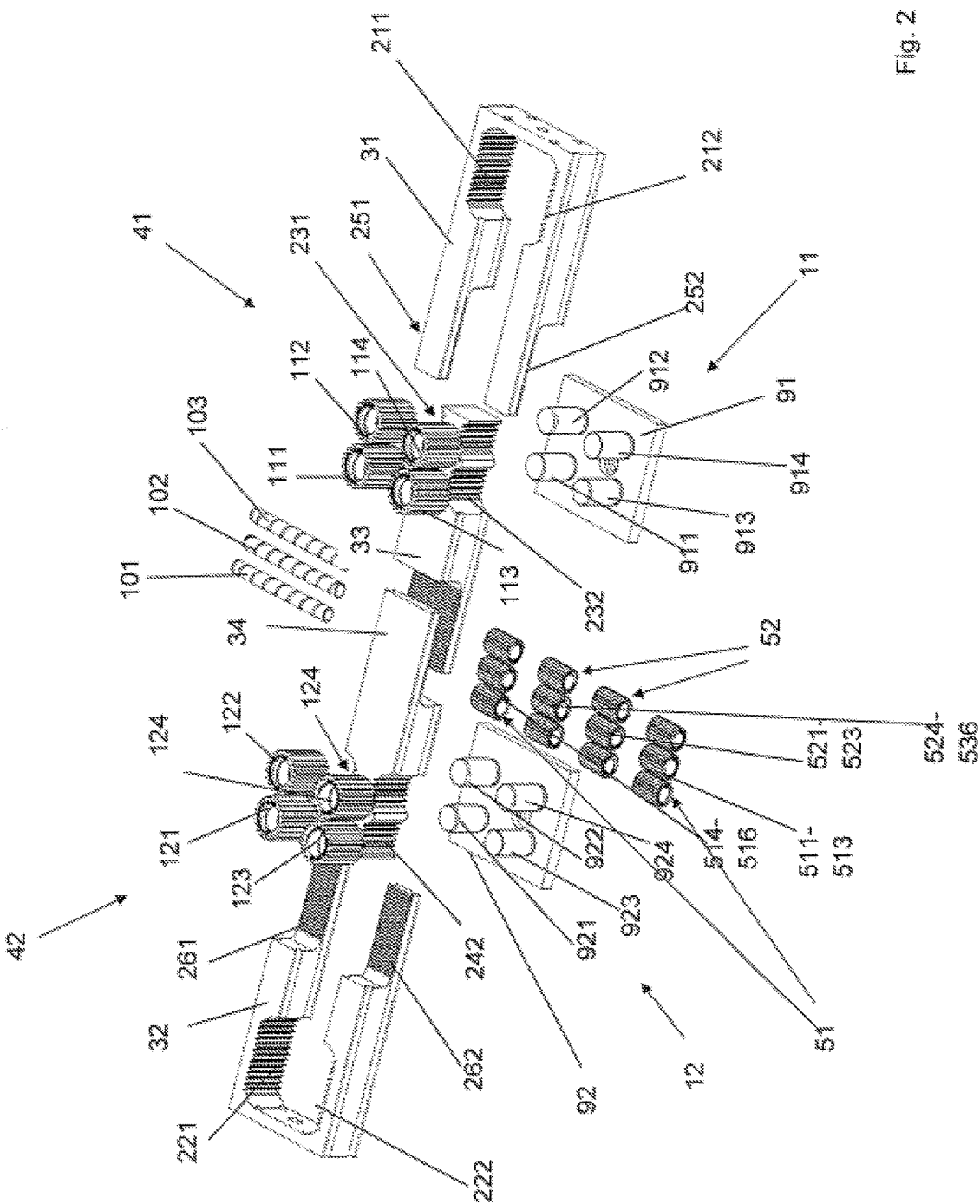
Figure 3:
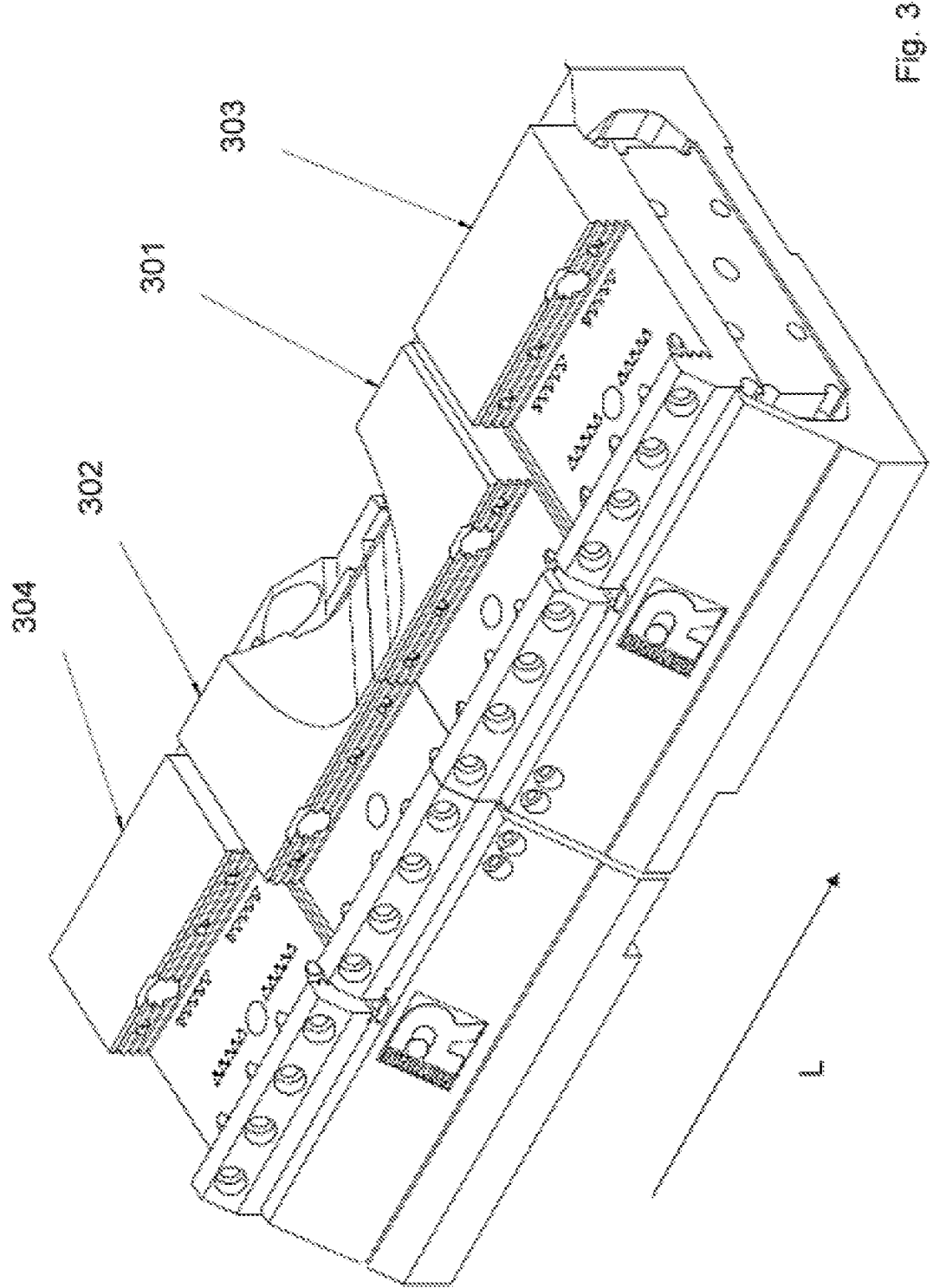
Figure 4:
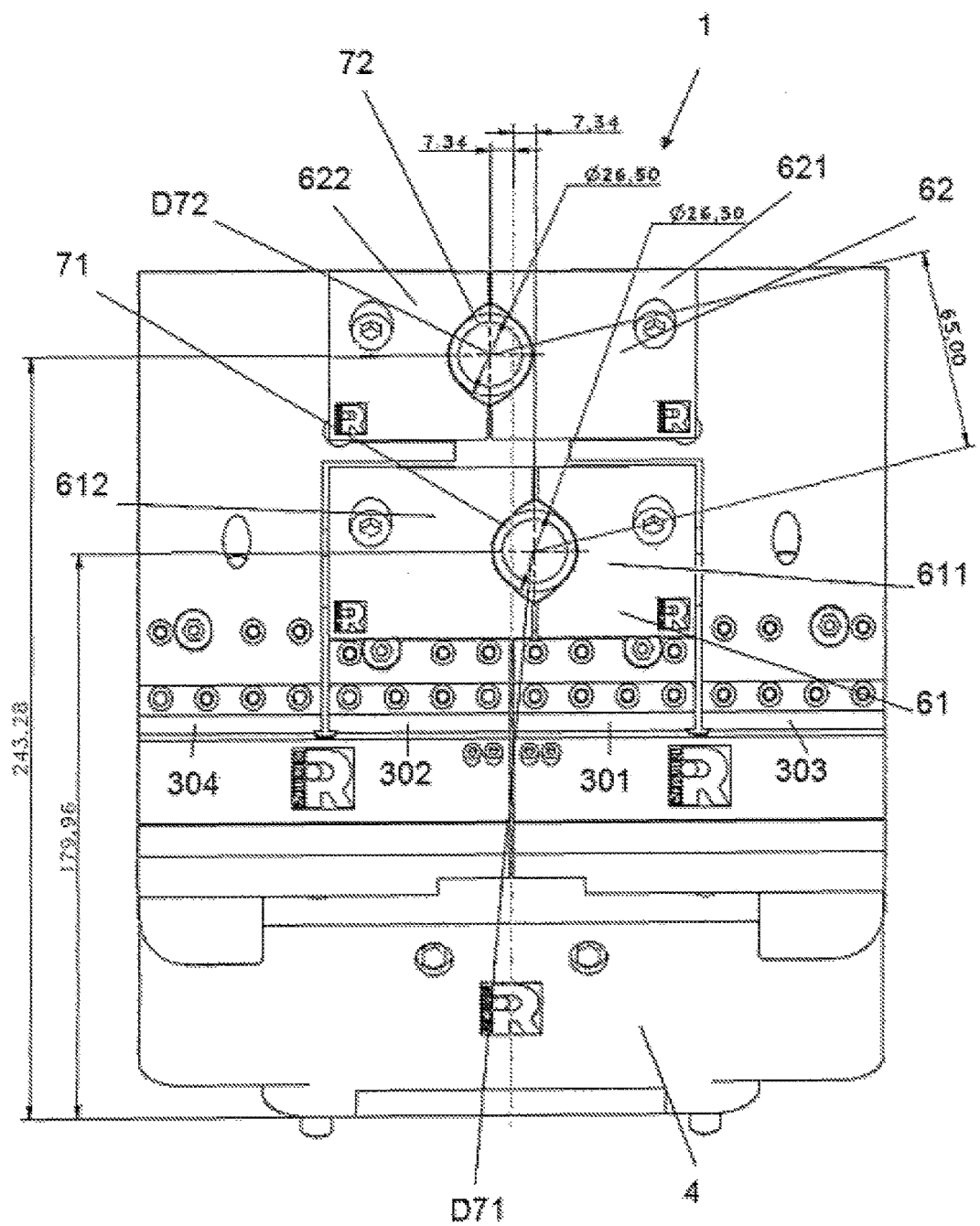
Figure 5:
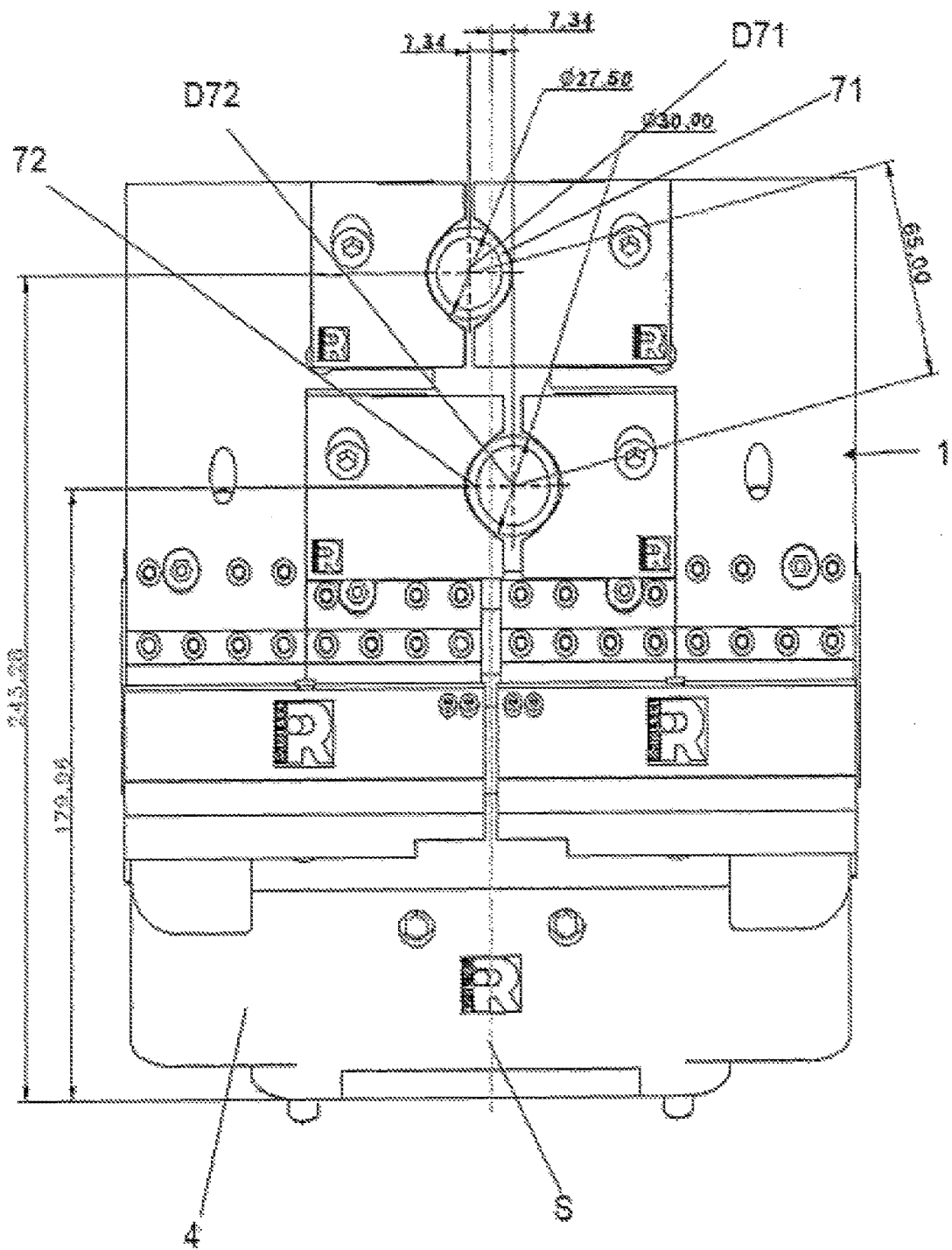
Figure 6:
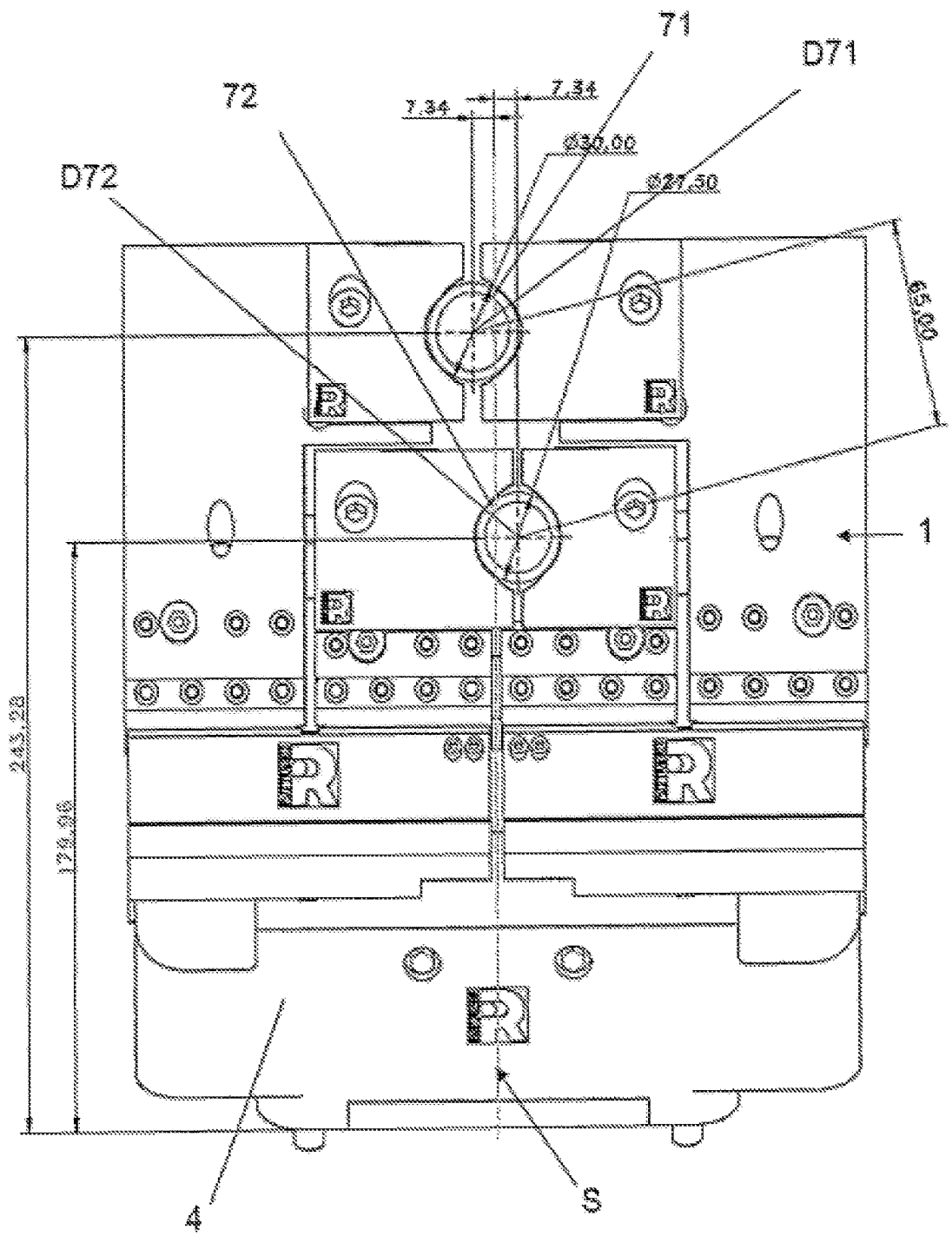

The invention will be described in six figures on the basis of an example of embodiment. In the figures:

FIG. 1 shows an equivalent circuit diagram of the synchronous differential clamp according to the invention, FIG. 2 shows an exploded view of the synchronous differential clamp according to the invention, FIG. 3 shows a perspective view of the assembled synchronous differential clamp, FIG. 4 shows a front view of the synchronous differential clamp with two clamped pipes of identical outside diameter, FIG. 5 shows a front view of the synchronous differential clamp of FIG. 4 with a first pipe of smaller diameter and a second pipe of larger diameter, FIG. 6 shows a front view of the synchronous differential clamp of FIG. 4 with a clamped first pipe of larger diameter and a second pipe of smaller diameter.

The schematic equivalent circuit diagram, shown in FIG. 1, of the structure of the synchronous differential clamp 1 shown in the following figures is intended to serve to explain the mode of operation. The synchronous differential clamp 1 is placed onto a centric clamp 4 which, by moving a wedge 6, moves two carrier plates 2, 3 away from one another and towards one another in a precisely symmetrical manner in relation to a spatial axis of symmetry S. The first carrier plate 2 is connected to a first differential gearing 41, and the second carrier plate 3 is connected to a second differential gearing 42. The first differential gearing 41 has a first differential pinion 11, and the second differential gearing 42 has a second differential pinion 12. The first differential pinion 11 is in engagement with a first 21 and a third tooth row 23, while the second differential pinion 12 is in engagement with a second 22 and fourth tooth row 24. The first carrier plate 2 is connected in a fixed position to an axis of rotation D11 of the first differential pinion 11, even under tensile and compressive load, while the second carrier plate 3 is connected in a fixed position to an axis of rotation D12 of the second differential pinion 12 under tensile and compressive load. The first and second axis of rotation D11, D12 are formed for example by a mandrel, onto which the respective differential pinion 11, 12 is placed in a rotatable manner. When the two carrier plates 2, 3 are moved towards one another in a precisely symmetrical manner, the first and second differential pinion 11, 12 are thus likewise moved towards one another in a precisely symmetrical manner; when the two carrier plates 2, 3 are moved away from one another in a precisely symmetrical manner, the first and second differential pinion 11, 12 are moved away from one another in a precisely symmetrical manner. The first and third tooth row 21, 23 are moved by the movement of the first differential pinion 11, and the second and fourth tooth row 22, 24 are moved by the movement of the second differential pinion 12, in each case to the same extent as the associated differential pinion 11, 12. The relative position of the first 21 to the third tooth row 23 remains constant initially during the movement of the first differential pinion 11, and the relative position of the second 22 to the fourth tooth row 24 likewise initially remains constant during the movement of the second differential pinion 12.

The first tooth row 21 is part of a first synchronous support 31, on which a fifth tooth row 25 is also arranged. The second tooth row 22 is part of a second synchronous support 32, on which a sixth tooth row 26 is also arranged. The third tooth row 23 is part of a third synchronous support 33, on which a seventh tooth row 27 is arranged, and the fourth tooth row 24 is part of a fourth synchronous support 34, on which an eighth tooth row 28 is also arranged. The fifth and sixth tooth row 25, 26 together with a first synchronous pinion 13 are part of a first synchronous gearing 51, while the seventh and eighth tooth row 27, 28 together with a second synchronous pinion 14 are part of a second synchronous gearing 52.

An arm having a second clamping jaw 621 of a second receptacle 62 projects in a fixed position from the first synchronous support 31. The second clamping jaw 621 of the second receptacle 62 is also connected in a fixed position to the first synchronous support 31, even under tensile and compressive load. An arm having another second clamping jaw 622 of the second receptacle 62 projects from the second synchronous support 32, wherein the second receptacle 62 is connected in a fixed position to the second synchronous support 32 under tensile and compressive load. In addition, an arm having a first clamping jaw 611 of a first receptacle 61 projects from the third synchronous support 33 and an arm having another first clamping jaw 612 of the first receptacle 61 projects from the fourth synchronous support 34, wherein one first 611 and the other first clamping jaw 612 of the first receptacle 61 are likewise respectively connected in a fixed position to the third and fourth synchronous support 33, 34 under tensile and compressive load.

When, driven by the centric clamp 4, the first and second differential pinion 11, 12 are moved towards one another, either a first pipe 71 held in the first receptacle 61 or first a second pipe 72 held in the second receptacle 62 is securely clamped. The two pipes 71, 72 are never exactly identical in terms of diameter, so that always one of the two pipes 71, 72 is clamped first, while that one of the two pipes 71, 72 which is of smaller diameter still remains loosely mounted in the associated receptacle 61, 62. If the first pipe 71 arranged in the first receptacle 61 is of larger diameter than the second pipe 72 arranged in the second receptacle 62, the first pipe 71 will be clamped first when the first and second differential pinion 11, 12 of the first and second differential gearing 41, 42 are moved towards one another, and namely in such a way that the clamping jaws 611, 612 of the first receptacle 61 bear against an outer wall of the first pipe 71. If the first and second differential gearing 41, 42 are then moved further towards one another, the second and third synchronous support 32, 33 cannot be moved further towards one another, and the first 11 and second differential pinion 12 start to rotate. In FIG. 1, the first differential pinion 11 rotates in the anticlockwise direction, and the second differential pinion 12 rotates in the clockwise direction. As a result, while the third and fourth support 23, 24 remain locally stationary, the first 21 and second synchronous support 22 are moved further towards one another until the second pipe 72 is clamped in the second receptacle 62. The first synchronous pinion 13 precisely synchronizes the movement of the fifth and sixth tooth row 25, 26, that is to say of the first and second synchronous support 31, 32, so that one second and the other second clamping jaw 621, 622 of the second receptacle 62 are likewise moved towards one another in a precisely symmetrical manner, even after the two first clamping jaws 611, 612 of the first receptacle 61 already bear firmly against the outer walls of the first pipe 71.

The correspondingly inverse mode of operation takes place when the second pipe 72 is of larger diameter than the first pipe 71. The movement of the clamping jaws 611, 612, 621, 622 of the two receptacles 61, 62 is therefore precisely symmetrical on account of the two differential gearings 41, 42 and the two synchronous gearings 51, 52, and the two centre axes D71, D72 of the two clamped pipes 71, 72, regardless of the outside pipe diameter, are always precisely at the same position relative to absolute space in the clamped state, that is to say for example relative to the stationary parts of the centric clamp 4.

In other words, regardless of the outside pipe diameter, the distance between the two pipe centre axes D71, D72 in the twin clamp 1 is always the same, and the arrangement of the two pipe centre axes D71, D72 relative to the surrounding environment, that is to say for example to the stationary housing of the centric clamp 4, is also always the same in the clamped state, regardless of the outside pipe diameter.

FIG. 2 shows the real design of the structure shown as a circuit diagram in FIG. 1. The first differential gearing 41 has four first differential pinions 111, 112, 113, 114 and the second differential gearing 42 has four second differential pinions 121, 122, 123, 124. Furthermore, the first tooth row 21 of the first differential gearing 41 comprises two first tooth row sections 211, 212 which are located opposite and parallel to one another in a first cutout 81 of the first synchronous support 31. In addition, the third tooth row 23 has two third tooth row sections 231, 232, wherein each of the two tooth row sections 231, 232 is again subdivided into in each case two parts. The first differential gearing 41 additionally comprises a differential support 91 with four first mandrels 911, 912, 913, 914 which project on the gearing side and onto which there is placed in a rotatable manner in each case one of the four first differential pinions 111, 112, 113, 114. The two first differential pinions 111, 112 engage in one tooth row section 211 of the first tooth row 21 and one tooth row section 231 of the third tooth row 23, while the two first differential pinions 113, 114 engage in the other tooth row section 212 of the first tooth row 21 and the other tooth row section 232 of the third tooth row 23.

The corresponding structure applies to the second differential gearing 42. This comprises a second differential support 92, from which four second mandrels 921, 922, 923, 924 project on the gearing side, onto which in each case a second differential pinion 121, 122, 123, 124 is placed in a rotatable manner. The second tooth row 22 is divided into two second tooth row sections 221, 222 which are located opposite one another in alignment in a cutout 82 of the second synchronous support 32. The fourth tooth row 24 is divided into two fourth tooth row sections 241, 242, which are in each case in turn divided into two, wherein each of the four parts is operatively connected to one of the four second differential pinions 121, 122, 123, 124. Two of the four second differential pinions 121, 122 engage in each case in one tooth row section 221 of the second tooth row 22 and one tooth row section 241 of the fourth tooth row 24. Two other of the four second differential pinions 123, 124 engage in each case in the other tooth row section 222 of the second tooth row 22 and the other tooth row section 242 of the fourth tooth row 24.

The first differential support 91 is mounted in a fixed position on the first carrier plate 2 of the centric clamp 4, and the second differential support 92 is mounted in a fixed position on the second carrier plate 3 of the centric clamp 4. When moved towards one another, that is to say when the centric clamp 4 is closed, the first and second differential gearing 41, 42 are moved towards one another, as a result of which at least at first also the second and fourth synchronous support 32, 34 move together in the inward direction and the first and third synchronous support 31, 33 likewise move inwards. The same applies when moved apart. The movement of the first and third synchronous support 31, 33 is symmetrical to the movement of the second and fourth synchronous support 32, 34. The four synchronous supports 31, 32, 33, 34 are coupled to one another via two synchronous gearings 51, 52. The first synchronous support 31 has the fifth tooth row 25, which comprises two fifth tooth row sections 251, 252 which are arranged parallel next to one another on the first synchronous support 31, wherein the teeth of the two tooth row sections 251, 252 point in the same direction.

The second synchronous support 52 has the sixth tooth row 26 which is likewise formed of two sixth tooth row sections 261, 262, wherein the two sixth tooth row sections 261, 262 likewise point in the same direction and are arranged parallel next to one another. The fifth and the sixth tooth row 25, 26 are moved one above the other in the assembled state of the synchronous differential clamp 1, so that the fifth tooth row 25 and the sixth tooth row 26 are located opposite one another. Provided between the fifth and sixth tooth row 25, 26 in each pair of tooth row sections 251, 261 and 252, 262 arranged one above the other are in each case three first synchronous pinions 511, 512, 513 and 514, 515, 516 which engage in one tooth row section 251, 261 and the other tooth row section 252, 262. The six first synchronous pinions 511, 512, 513, 514, 515, 516 of the fifth and sixth tooth row 25, 26 are rotatably mounted on three shafts 101, 102, 103.

In addition, the eighth tooth row 28 is also arranged on the fourth synchronous support 34 and the seventh tooth row 27 is arranged on the third synchronous support 33. The seventh and eighth tooth row 27, 28 are likewise located opposite one another, with the teeth pointing towards one another, in the assembled state of the synchronous differential clamp 1. Provided between the seventh and eighth tooth row 27, 28 are six second synchronous pinions 521, 522, 523, 524, 525, 526 of the second synchronous gearing 52, which are mounted on the same three shafts 101, 102, 103 as the two groups of three first synchronous pinions 511, 512, 513 and 514, 515, 516 of the first synchronous gearing 51.

The mode of operation of the synchronous differential clamp 1 in FIG. 2 corresponds to that in FIG. 1 with suitable replacements. In order to understand the mode of operation thereof, reference is made to FIG. 1. The one first differential pinion 11 is replaced here by the four first differential pinions 111, 112, 113, 114. The one second differential pinion 12 is replaced by the four second differential pinions 121, 122, 123, 124 and the first synchronous pinion 13 is replaced by the six first synchronous pinions 511, 512, 513, 514, 515, 516 and the second synchronous pinion 14 is replaced by the six second synchronous pinions 521, 522, 523, 524, 525, 526.

In FIG. 2, the second clamping jaw 621 of the second receptacle 62 is arranged on the second synchronous support 32 in a fixed position relative to the latter, and the other second clamping jaw 622 of the second receptacle 62 is arranged on the first synchronous support 31 in a fixed position relative to the latter, the first clamping jaw 611 of the first receptacle 61 is arranged on the third synchronous support 33 in a fixed position relative to the latter, and the other first clamping jaw 612 of the first receptacle 61 is arranged on the fourth synchronous support 34 in a fixed position relative to the latter. The first and second receptacle 61, 62 are however not shown in FIG. 2 for reasons of clarity.

FIG. 3 shows the synchronous differential clamp 1 of FIG. 2 in an assembled version. A first mounting plate 301 for attaching the second clamping jaw 621 of the second receptacle 62 is provided on the first synchronous support 31, a second mounting plate 302 for attaching the other second clamping jaw 622 of the second receptacle 62 is provided on the second synchronous support 32, and a third mounting plate 303 for attaching the first clamping jaw 611 of the first receptacle 61 is provided on the third synchronous support 33, and a fourth mounting plate 304 for attaching the other first clamping jaw 612 of the first receptacle 61 is provided on the fourth synchronous support 34. The four mounting plates 301, 302, 303, 304 are able to move back and forth in the longitudinal direction L in a coupled manner, as described above, according to the synchronous supports 31, 32, 33, 34 assigned thereto.

The first and second mounting plate 301, 302 are able to move towards one another and away from one another in the longitudinal direction L in a precisely symmetrical manner, and the third and fourth mounting plate 303, 304 are likewise able to move towards one another and away from one another in the longitudinal direction L in a precisely symmetrical manner.

FIG. 4 shows the synchronous differential clamp 1 of FIG. 3, placed onto the centric clamp 4. An arm having a clamping jaw 611, 612, 621, 622 of the respective receptacle 61, 62 projects from each of the mounting plates 301, 302, 303, 304. FIG. 4 shows two clamped pipes 71, 72 having an identical outside diameter. The first pipe 71 has an outside diameter of 26.5 mm, the second pipe 72 has an outside diameter of likewise 26.5 mm. The distance between the two centre axes D71, D72 is 65 mm, while the shortest distance of the pipe centre axes D71, D72 from a spatial axis of symmetry S, which corresponds to the axis of symmetry of the centric clamp 4, is in each case 7.34 mm. The first pipe 71 is securely clamped in the first receptacle 61, and the second pipe 72 is simultaneously securely clamped in the second receptacle 62.

FIG. 5 shows the synchronous differential clamp 1 with a first pipe 71 having a larger outside diameter of 30 mm and a second pipe 72 having a smaller outside diameter of 27.5 mm. It is essential to the invention that the distance between the two pipe centre axes D71, D72, as in the case of the arrangement in FIG. 4, is precisely 65 mm, and the distance of the pipe centre axis D71 of the first pipe 71 from the spatial axis of symmetry S is again 7.34 mm and the distance of the pipe centre axis D72 of the second pipe 72 from the spatial axis of symmetry S, again as in FIG. 4, is 7.34 mm. In other words, despite modified pipe outside diameters of the two pipes 71, 72 in comparison to FIG. 4, the centre axes D71, D72 of the two pipes 71, 72, as seen in relation to the centric clamp 4, are positioned in a precisely identical manner in the clamped state of the two pipes 71, 72, regardless of the pipe outside diameter.

FIG. 6 shows the corresponding arrangement of the synchronous differential clamp 1 in the case of a first smaller pipe outside diameter of 27.5 mm and a second larger pipe diameter of 30 mm. Here, too, the distance between the two pipe centre axes D71, D72 still remains exactly the same as in the case of clamped pipes 71, 72 of any other diameter, namely here of 65 mm. The distance of the two pipe centre axes D71, D72 from the spatial axis of symmetry S still remains constant regardless of the pipe diameter, and in this example is 7.34 mm.

The synchronous differential clamp 1 according to the invention thus makes it possible simultaneously to clamp two pipes 71, 72 securely, and in so doing to keep constant in space the pipe centre axes D71, D72, regardless of the pipe outside diameter, so that the pipe ends of the two pipes 71, 72 can be machined by a respective tool head, for example a chamfering head, without having to readjust for each machining cycle the relative position of tool head and clamped pipe.

LIST OF REFERENCES 1 synchronous differential clamp/twin clamp
2 carrier plate
3 carrier plate
4 centric clamp 6 wedge
11 first differential pinion
12 second differential pinion
13 first synchronous pinion
14 second synchronous pinion
21 first tooth row
22 second tooth row
23 third tooth row
24 fourth tooth row
25 fifth tooth row
26 sixth tooth row
27 seventh tooth row
28 eighth tooth row
31 first synchronous support
32 second synchronous support
33 third synchronous support
34 fourth synchronous support
41 first differential gearing
42 second differential gearing
51 first synchronous gearing
52 second synchronous gearing
61 first receptacle
62 second receptacle
71 first pipe
72 second pipe
81 cutout
82 cutout
91 first differential support
92 second differential support
101 shaft
102 shaft
103 shaft
111 first differential pinion
112 first differential pinion
113 first differential pinion
114 first differential pinion
121 second differential pinion
122 second differential pinion
123 second differential pinion
124 second differential pinion
211 one first tooth row section
212 other first tooth row section
221 one second tooth row section
222 other second tooth row section
231 one third tooth row section
232 other third tooth row section
241 one fourth tooth row section
242 other fourth tooth row section
251 one fifth tooth row section
252 other fifth tooth row section
261 one sixth tooth row section
262 other sixth tooth row section
301 first mounting plate
302 second mounting plate
303 third mounting plate
511 first synchronous pinion
512 first synchronous pinion
513 first synchronous pinion
514 first synchronous pinion
515 first synchronous pinion
516 first synchronous pinion
521 fourth synchronous pinion
522 fourth synchronous pinion
523 fourth synchronous pinion
524 fourth synchronous pinion
525 fourth synchronous pinion
526 fourth synchronous pinion
611 one first clamping jaw
612 other first clamping jaw
621 one second clamping jaw
622 other second clamping jaw
911 first mandrel
912 first mandrel
913 first mandrel
914 first mandrel
921 second mandrel
922 second mandrel
923 second mandrel
924 second mandrel
D11 axis of rotation
D12 axis of rotation
D71 pipe centre axis
D72 pipe centre axis
L longitudinal direction
S spatial axis of symmetry

The invention claimed is:

1. Twin clamp, comprising:
first and second receptacles (61, 62), each of which has two movable clamping jaws (611, 612, 621, 622) and by means of each of which an elongate profile segment (71, 72) having a circular cross-section can be clamped in a contact section, each elongate profile segment having a center axis (D71, D72) and an outside diameter;
a first and a second differential gearing (41, 42);
wherein a respective two of the clamping jaws (611,612, 621,622) of different respective receptacles of the two receptacles (61, 62) are coupled to one another via a respective one of the differential gearings (41, 42) and two of the clamping jaws (611, 612, 621, 622) of a same receptacle of the two receptacles (61, 62) are coupled to one another via a synchronous gearing (51, 52) and the position of the centre axes (D71, D72) of the clamped elongate profile segments (71, 72) is independent of the size of the outside diameters of the elongate profile segments (71, 72), wherein the twin clamp further comprises a centric clamp (4) for the two differential gearings (41, 42), by which the two differential gearings (41, 42) can be moved relative to one another.

2. Twin clamp according to claim 1,
characterized in that the first clamping jaw (611) of the first receptacle (61) and the second clamping jaw (621) of the second receptacle (62) are coupled to one another via the first differential gearing (41) and the other first clamping jaw (612) of the first receptacle (61) and the other second clamping jaw (622) of the second receptacle (62) are coupled to one another via the second differential gearing (42), and the first clamping jaw (611) and the other first clamping jaw (612) are coupled to one another via a first synchronous gearing (51) and the second clamping jaw (621) and the other second clamping jaw (622) are coupled to one another via a second synchronous gearing (52).

3. Twin clamp according to claim 2,
characterized by the first synchronous gearing (51) which has at least one fifth tooth row (25) on a first synchronous support (31) with two fifth tooth row sections (251, 252) located next to one another and at least one sixth tooth row (26) on a second synchronous support (32) with two sixth tooth row sections (261, 262), and in that in each case there is arranged between the two fifth (251, 252) and the two sixth tooth row sections (261, 262) at least one first synchronous pinion (511-

516) which couples the two fifth (251, 252) and sixth tooth row sections (261, 262) to one another, and the second synchronous gearing (52) which has at least one seventh tooth row (27) on a third synchronous support (33) and at least one eighth tooth row (28) on the fourth synchronous support (34), wherein there is arranged between the seventh (27) and the eighth tooth row (28) at least one second synchronous pinion (521-526) which couples the seventh (27) and eighth tooth row (28) to one another.

4. Twin clamp according to claim 3,
characterized by a first (91) and a second differential support (92), on which the first differential pinions (111-114) and respectively second differential pinions (121-124) are rotatably mounted and which are connected in a fixed position to carrier plates (301-304) of the centric clamp (4).

5. Twin clamp according to claim 3,
characterized in that one first clamping jaw (611) of the first receptacle (61) is connected in a fixed position to the third synchronous support (33) and the other first clamping jaw (612) of the first receptacle (61) is connected in a fixed position to the second synchronous support (32) and one second clamping jaw (621) of the second receptacle (62) is connected in a fixed position to the first synchronous support (31) and the other second clamping jaw (622) of the second receptacle (62) is connected in a fixed position to the fourth synchronous support (34).

6. Twin clamp according to claim 1,
characterized by the first differential gearing (41) comprising a first synchronous support (31) having at least one first tooth row (21) and comprising a third synchronous support (33) having at least one third tooth row (23), and at least one first differential pinion (11) which engages in the at least one first (21) and the at least one third tooth row (23) and couples the first (21) and third tooth row (23) to one another, and by the second differential gearing (42) comprising a second synchronous support (32) having at least one second tooth row (22) and comprising a fourth synchronous support (34) having at least one fourth tooth row (24), and at least one second differential pinion (12) which engages in the at least one second and the at least one fourth tooth row (24) and couples the second (22) and fourth tooth row (24) to one another.

7. Twin clamp according to claim 6,
characterized in that the at least one first tooth row (21) comprises two first tooth row sections (211, 212) which are located opposite one another and between which two first groups of first differential pinions (111-114) are arranged, and in that two third tooth row sections (231, 232) which are located opposite one another are arranged between the two first groups of first differential pinions (111-114) and each of the groups of first differential pinions (111-114) engages in respectively one first (211) and one third tooth row section (231), and the at least one second tooth row (22) comprises two second tooth row sections (221, 222) which are located opposite one another and between which two second groups of second differential pinions (511-514) are arranged, and in that two fourth tooth row sections (241, 242) which are located opposite one another are arranged between the two second groups of second differential pinions (511-514) and each of the groups of second differential pinions (511-514) engages in respectively one second (221) and one fourth tooth row section (241).

* * * * *